Figure 1:
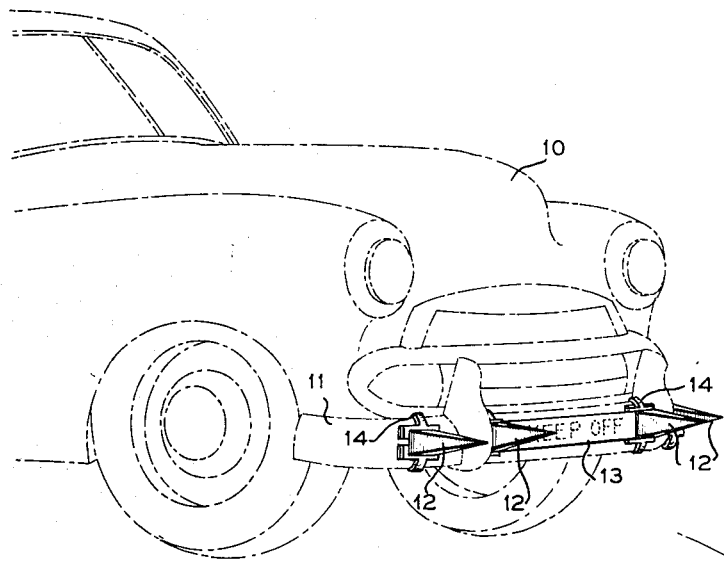

Jan. 10, 1956  D. M. JOHNSON  2,730,396
AUTOMOBILE BUMPER ATTACHMENT
Filed May 19, 1952  2 Sheets-Sheet 1

INVENTOR.
D. M. JOHNSON
BY
A. Yates Dowell
ATTORNEY

Jan. 10, 1956  D. M. JOHNSON  2,730,396
AUTOMOBILE BUMPER ATTACHMENT
Filed May 19, 1952  2 Sheets-Sheet 2
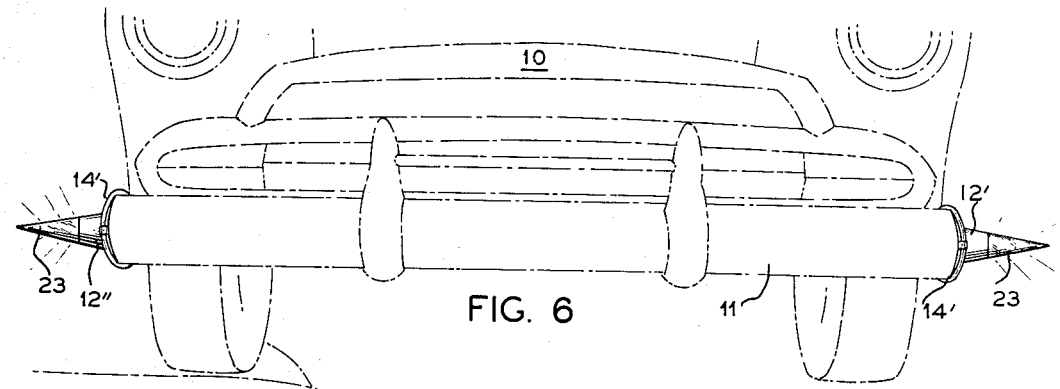
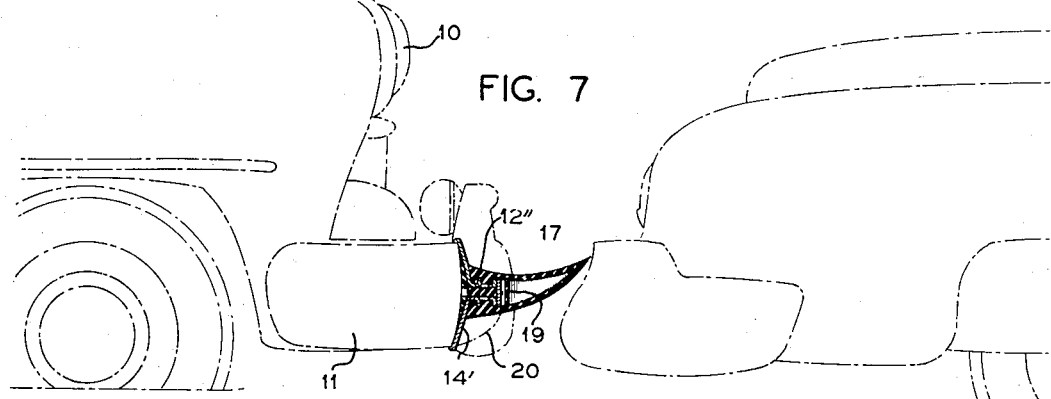
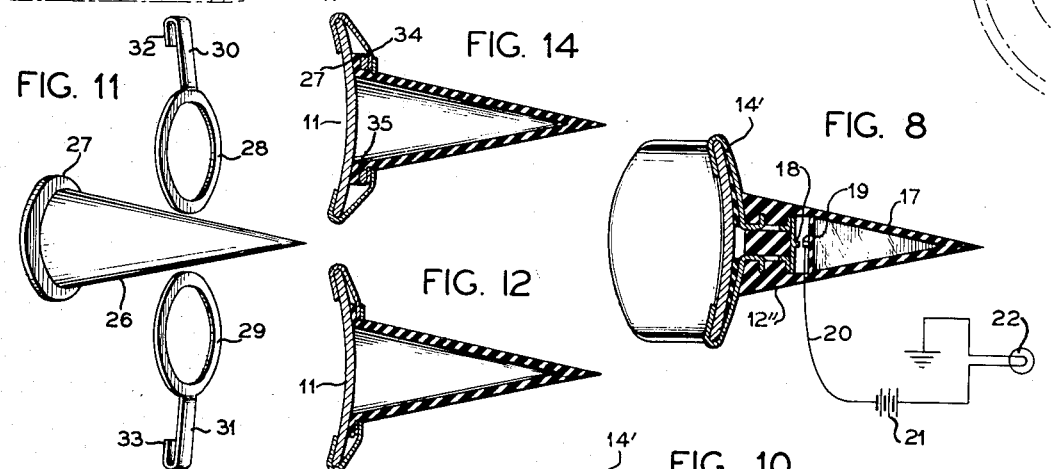
INVENTOR.
D. M. JOHNSON
BY
A. Yates Dowell
ATTORNEY

United States Patent Office 2,730,396
Patented Jan. 10, 1956

2,730,396

AUTOMOBILE BUMPER ATTACHMENT

Darrell M. Johnson, Thomson, Ga., assignor to The Laudar Company, Thomson, Ga., a corporation of Georgia Application May 19, 1952, Serial No. 288,643

11 Claims. (Cl. 293—71)

This invention relates to the art of transportation and more particularly to safety in transportation including the prevention of injury to person and property.

The invention relates primarily to motor vehicle transportation and the provision of means comprehensible to the human senses which will have a pronounced psychological effect upon persons and promote the safe driving and handling of motor vehicles on the highway so that they will be operated with at least a car length between them and other nearby vehicles.

Specifically the invention relates to bumpers and bumper guards of the character used on automobiles or other manually controlled vehicles for protecting the car from injury and to prevent injury to other cars.

Increase in motor vehicles has brought about congestion in traffic, particularly on the highways so that numerous minor accidents occur resulting at least in scratched fenders, marred bumpers or the like, many of which accidents could be avoided if desired by the operator of the offending vehicle. Operators frequently allow their cars to roll in contact with the bumpers of cars they are following, or they permit their cars to roll back against the cars following them. This annoying to the drivers of the other vehicles, frequently precipitating an argument and ill feeling and requiring repairs of damages both to the property and to the feelings of the individuals.

It is an object of the invention to provide a bumper or an attachment therefor which can be easily and inexpensively produced, readily applied, and which when in use will serve a useful purpose in designating a clearance guide to the operator of a motor vehicle permitting the vehicle to come in contact with such bumper or attachment and if there is physical contact the cushioning of the device will reduce the impact and consequent damage.

Another object of the invention is to provide a structure of the character described which will have a psychological effect on third parties including the drivers of other vehicles and thus promote safe and sane operation including the maintenance of the proper distance between vehicles and respect for the rights of others.

A further object of the invention is to provide a bumper or parts therefor which can be easily and quickly applied without any special tools, which are attractive or of ornamental appearance.

Further objects of the invention will be apparent from the following description taken in conjunction with the accompanying drawings, wherein:

Fig. 1 is a perspective illustrating the application of the invention to the front end of an automobile.

Figure 2:
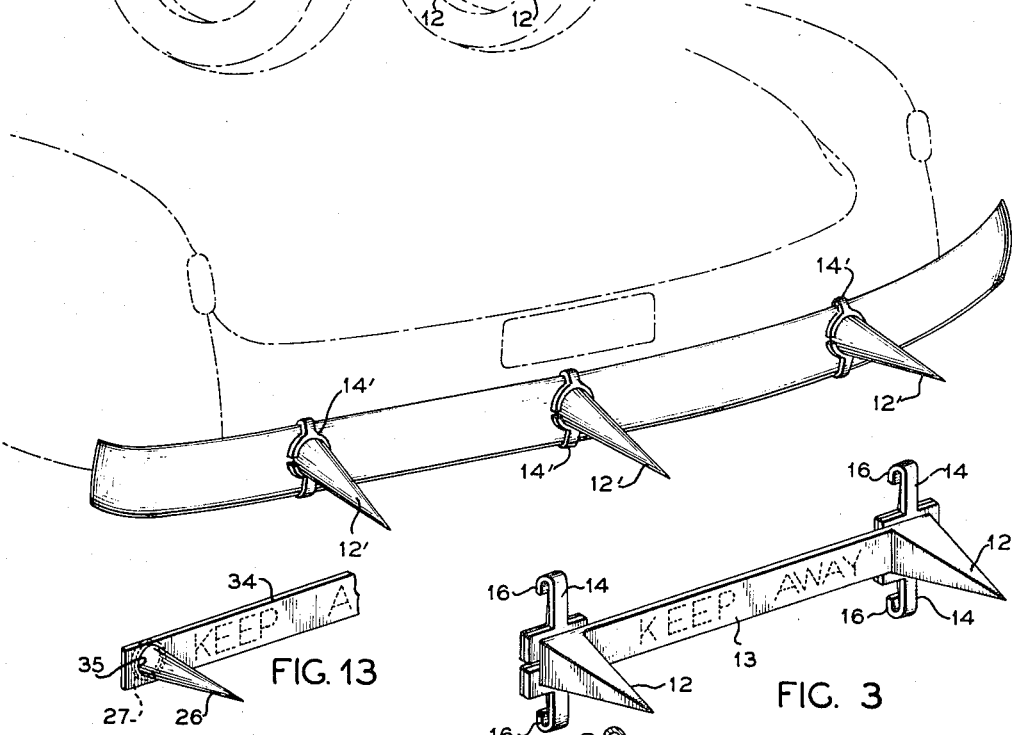
Figure 13:
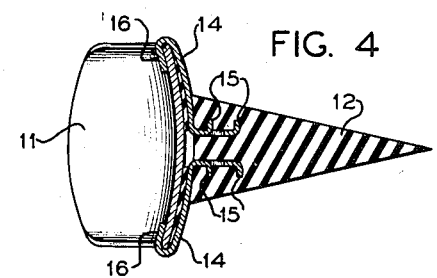
Figure 3:
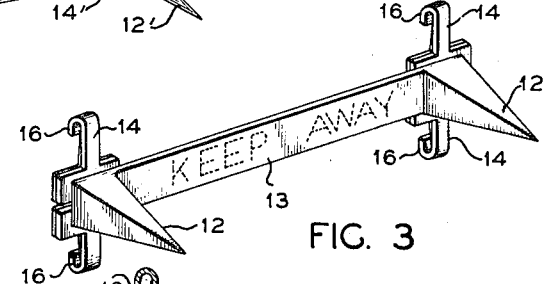
Figures 4, 5:
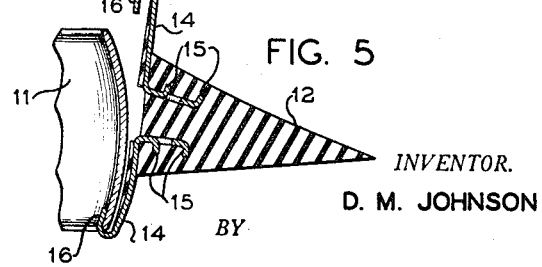

Fig. 2, a similar view illustrating the invention applied to the rear of the automobile;

Fig. 3, a perspective illustrating one application of the invention per se;

Figs. 4 and 5, vertical sections through one of the spikes or projections of Fig. 3, and disclosing the same mounted on a bumper in Fig. 4, and the method of mounting or removing in Fig. 5;

Fig. 6, a perspective of the front end of an automobile with a modified type of spike or projection applied thereto;

Fig. 7, a side elevation of the front and rear ends of two cars illustrating the spike or projection and the manner in which it is deflected;

Fig. 8, a vertical section illustrating the spike or projection of Fig. 7 applied to the bumper, with a wiring diagram for an electric signal;

Fig. 9, a vertical section of a modified form of spike or projection applied to a bumper;

Fig. 10, a similar view of a further modification including a source of illumination;

Fig. 11, an exploded perspective of a modified form of mounting means for the projection;

Fig. 12, a vertical section illustrating the manner in which the structure of Fig. 11 is applied to a bumper;

Fig. 13, a fragmentary perspective illustrating a modification of the structure of Fig. 3 for use with mounting means of Fig. 11; and Fig. 14, a vertical section illustrating the mounting means of the device shown in Fig. 13.

Briefly stated, the invention comprises an attachment for the bumper or other part of an automobile or other vehicle which attachment comprises one or more spikes or projections of resilient material of dangerous appearance which tend to warn against contact with the same. These spikes or projections may be mounted in series or individually. They may be solid or hollow, and may be interposed in an electrical signalling system either visible or audible. The projections may be of single or multiple parts and be provided with mounting fasteners. Devices of this nature encourage safety on the highway, avoid injury to property and to the person causing vehicles to be kept apart in traffic and cushioning the impact when vehicles collide end to end.

Referring to the drawings, an automobile 10 having a bumper 11 both of conventional construction, may have applied thereto one or more resilient spikes or projections 12 each having a base and a wall tapering therefrom to a relatively sharp apex. The spikes or projections 12 may be connected by a strap or bar 13 which maintains them in the desired spaced relation.

The mounting of the spikes or projections 12 may be by the use of suitable clips 14 having anchoring members 15 embedded in the body of the projections 12 and with hooks 16 disposed at the upper and lower extremities of the clips 14. The body of the spikes or projections is of rubber or other resilient material so that when the clips 14 are pulled apart, as shown in Fig. 5, the device can be applied to the bumper 11, and after such application is snugly mounted upon said bumper.

As disclosed in Figs. 1, 3 and 4, the spikes or projections are each in the shape of a pyramid. However, as illustrated in Fig. 2, projections 12' of conical or other shape may be substituted, in which case, mounting clips 14' are employed being modified only to accommodate the conical member instead of the wall of a pyramid.

In Figs. 6 to 10 inclusive, additional modified forms of the spike or projection are illustrated. In Figs. 6, 7, 8 and 10 is illustrated an attachment which may serve as a clearance guide for day and night use, or if desired as a right and left turn signal. This device includes a two-part conical member 12' mounted by means of clips 14' and having a removable tip 17 in which is embedded spaced electrical contacts 18 and 19. The contact 18 is grounded to the bumper 11 and a conductor 20 provides an electrical connection with a source of electrical energy 21.

In use the deflection of the tip 17 will cause the contacts 18 and 19 to be brought together to complete the electrical circuit and energize a light or other signal 22 on the vehicle.

If desired, the contacts 18 and 19 may be omitted, as shown in Fig. 9.

On the other hand, if desired, the tip of the projection may be of transparent or translucent material to permit the passage of light rays therethrough and such tip 23 may house a light bulb 24 the socket of which is grounded and the bulb itself being connected by the conductor 25.

A further modified form of the invention is shown in Figs. 11 and 12 in which there is provided a conical projection 26 of rubber or other suitable resilient material, this projection 26 having a base flange 27. The projection 26 may be secured to the bumper 11 of an automobile by two clips comprising rings 28 and 29 of metal, plastic, or other suitable material, each of these rings 28 and 29 having a radially extending tab 30 and 31, each tab terminating in a hook 32 and 33 respectively. As shown in Fig. 12, the projection 26 is secured to the bumper 11 by placing ring 28 over the conical projection 26 and in engagement with the base flange 27 with the hook 32 engaged over the upper end of the bumper 11. The second ring 29 is likewise positioned over the projection 26 and in engagement with the outer surface of the ring 28 with the hook 33 engaging over the lower edge of the bumper 11. The hooks 32 and 33 are held in firm engagement with the edges of the bumper 11 by the resiliency of the material forming the projection 26. This form of the invention represents both a simple and economical way of fabricating the device, and at the same time provides a convenient means for securing the same in any desired location upon the automobile bumper.

As shown in Figs. 13 and 14 the same individual clips for mounting the projections upon the automobile bumper may be utilized in conjunction with a conical projection 26 having a base flange 27 and assembled with a spacing bar or strap 34. As shown in Figs. 13 and 14 the conical projection 26 is positioned in an aperture 35 in the strap 34 with the base flange 27 abutting the rear surface of the strap 34. The rings 28 and 29 are installed as described above and the resiliency of the projection 26 securely holds the hooks 32 and 33 in engagement with the upper and lower edges of the bumper 11. Thus, the projections 26 and the strap 34 may be conveniently positioned upon the bumper in any desired location.

The latter two forms of the invention above described preclude the necessity of molding holding means into the material of the projection itself and permit the use of extremely economical production methods in which the conical projection may be conveniently molded and the rings 28 and 29 stamped from suitable material.

From the foregoing it will be understood that the present invention promotes safety, may be used independently or in multiples, may be of conical or pyramidal shape or other desired configuration, may be of one or more parts, solid or hollow, equipped to provide a visible, audible or other traffic signal, serve as a clearance guide for day or night use, and an absorber for shock or impact. Further the device not only has utilitarian characteristics but is of an ornamental nature, and is also sufficiently dangerous or formidable in appearance that it will have a sobering influence on those by whom it is observed.

It will be obvious to those skilled in the art that various changes may be made in the invention without departing from the spirit and the scope thereof and therefore the invention is not limited by that which is shown in the drawings and described in the specification but only as indicated in the appended claims.

What is claimed is:

1. A bumper guard comprising a series of projections of resilient material each having a base and a wall tapering therefrom to a relatively sharp apex, a pair of clips mounting each bumper guard, said clips having independent anchoring portions disposed lengthwise of said projection and having oppositely extending portion located inwardly of the bottom of the projection to provide a resilient facing for said mounting clips to avoid metal-to-metal contact and prevent injury to the surface of the bumper to which said projection is attached, said clips having hooks at their remote ends for engaging opposite edges of a bumper, the resilient material of which said projects are composed permitting said hooks to be moved toward and from each other to resiliently engage the bumper, said projection having a hollow tip made in two parts and an electrical signalling means associated with said tip and adapted to be energized to give a signal.

2. A bumper guard comprising a series of projections of resilient material each having a base and a wall tapering therefrom to a relatively sharp apex, a pair of clips mounting each bumper guard, said clips having anchoring portions disposed lengthwise of said projection and having oppositely extending portions inwardly of the bottom of the projection to provide a resilient facing for said mounting clips to avoid metal-to-metal contact and prevent injury to the surface of the bumper to which said projection is attached, said clips having hooks at their remote ends for engaging opposite edges of a bumper, the resilient material of which said projections are composed permitting said hooks to be moved toward and from each other to resiliently engage the bumper.

3. A bumper guard comprising a series of projections of resilient material each having a base and a wall tapering therefrom to a relatively sharp apex, a pair of clips mounting each bumper guard, said clips having anchoring portions disposed lengthwise of said projection and having oppositely extending portions, said clips having hooks at their remote ends for engaging opposite edges of a bumper, the resilient material of which said projections are composed permitting said hooks to be moved toward and from each other to resiliently engage the bumper.

4. A bumper guard comprising a projection of resilient material having a base flange and a wall tapering therefrom to a relatively sharp apex, a pair of clips mounting said guard, said clips having portions engaging the base of said projection and having yieldable hook portions spaced in a manner to engage opposite edges of a bumper, the resilient material of said projection when engaged by said clips permit said hooks to move toward and from each other whereby said hooks will resiliently secure said projection on the bumper.

5. A bumper guard comprising a projection of resilient material having a base flange and a wall tapering therefrom to a relatively sharp apex, a pair of clips mounting said guard, each clip comprising a ring portion removably embracing said projection adjacent said flange, a tab extending radially from said ring portion and terminating in a hook, the hooks on said clips being oppositely disposed and engaging opposed edges of a bumper, the resiliency of said material urging said hooks toward each other.

6. A bumper guard comprising a projection of resilient material having a base flange and a wall tapering therefrom to a relatively sharp apex, a pair of clips mounting said guard, each clip comprising a ring portion removably embracing said projection adjacent said flange, a hook on said ring portion, the hooks on said clips being oppositely disposed and engaging opposed edges of a bumper, the resiliency of said material urging said hooks toward each other.

7. A bumper guard comprising a series of projections of resilient material each having a base flange and a wall tapering therefrom to a relatively sharp apex, a spacing strap having apertures for receiving said projections with said flanges abutting the rear surface of said strap, indicia on said strap, a pair of clips for securing each projection and said strap to a bumper, each clip comprising a ring portion removably embracing said projection adjacent the front face of said strap, a tab extending radially from said ring portion and terminating in a hook, the hooks on said clips being oppositely disposed and engaging opposed edges of the bumper, the resiliency of said material urging said hooks toward each other.

8. A bumper guard comprising a series of projections of resilient material each having a base flange and a wall tapering therefrom to a relatively sharp apex, a spacing strap having apertures for receiving said projections with said flanges abutting the rear surface of said strap, a pair of clips for securing each projection and said strap to a bumper, each clip comprising a ring portion removably embracing said projection adjacent the front face of said strap, a tab extending radially from said ring portion and terminating in a hook, the hooks on said clips being oppositely disposed and engaging opposed edges of the bumper, the resiliency of said material urging said hooks toward each other.

9. A bumper guard comprising a series of projections of resilient material each having a base flange and a wall tapering therefrom to a relatively sharp apex, a spacing strap having apertures for receiving said projections with said flanges abutting the rear surface of said strap, a pair of clips for securing each projection and said strap to a bumper, each clip comprising a ring portion removably embracing said projection adjacent the front face of said strap, a hook extending from said ring portion, the hooks on said clips being oppositely disposed and engaging opposed edges of the bumper, the resiliency of said material urging said hooks toward each other.

10. A bumper guard comprising a projection of resilient material having a base and a wall tapering therefrom to a relatively sharp apex, a pair of clips mounting said guard, each clip comprising a portion engaging said projection adjacent said base, a tab extending radially from said portion and terminating in a hook, the hooks on said clips being oppositely disposed for engaging opposed edges of a bumper, and means urging said hooks toward each other.

11. Bumper guarding means including one or more projections of resilient material, each projection having a base and a body tapering substantially to a point therefrom, mounting means for attaching said guarding means to a bumper, said mounting means having a portion detachably engaging said projection adjacent its base and a hook extending laterally from said portion for attachment over the edge of the bumper, and means urging said hook toward bumper engaging position.

References Cited in the file of this patent

UNITED STATES PATENTS

| | | |
|---|---|---|
| 1,658,764 | Finn | Feb. 7, 1928 |
| 1,665,780 | Hamburger | Apr. 10, 1928 |
| 1,670,737 | Muser | May 22, 1928 |
| 2,039,804 | Klump | May 5, 1936 |
| 2,041,931 | Hunziker | May 26, 1936 |
| 2,145,952 | Ryan | Feb. 7, 1939 |
| 2,471,040 | Mohar | May 24, 1949 |
| 2,508,149 | Eliassen | May 16, 1950 |